(12) United States Patent
Forsyth

(10) Patent No.: US 8,498,671 B2
(45) Date of Patent: Jul. 30, 2013

(54) MOBILE TELEPHONE DEVICE WITH USER-SELECTABLE CONTENT DISPLAYED AND UPDATED DURING IDLE TIME

(75) Inventor: John Matthew Forsyth, London (GB)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1462 days.

(21) Appl. No.: 10/451,500

(22) PCT Filed: Dec. 19, 2001

(86) PCT No.: PCT/GB01/05658
§ 371 (c)(1),
(2), (4) Date: Nov. 28, 2003

(87) PCT Pub. No.: WO02/052815
PCT Pub. Date: Jul. 4, 2002

(65) Prior Publication Data
US 2004/0077340 A1    Apr. 22, 2004

(30) Foreign Application Priority Data

Dec. 22, 2000    (GB) .................................. 0031477.3

(51) Int. Cl.
*H04M 1/00*    (2006.01)
(52) U.S. Cl.
USPC ......................................... 455/566; 705/411

(58) Field of Classification Search
USPC ............ 455/414.3, 412, 466, 566, 3.06, 3.01, 455/414.1
See application file for complete search history.

(56) References Cited

U.S. PATENT DOCUMENTS

| | | | | |
|---|---|---|---|---|
| 5,870,683 A | * | 2/1999 | Wells et al. | 455/566 |
| 6,138,158 A | * | 10/2000 | Boyle et al. | 709/225 |
| 6,363,419 B1 | * | 3/2002 | Martin et al. | 709/219 |
| 7,136,631 B1 | * | 11/2006 | Jiang et al. | 455/414.1 |
| 2002/0107002 A1 | * | 8/2002 | Duncan et al. | 455/412 |

FOREIGN PATENT DOCUMENTS

| | | |
|---|---|---|
| EP | 0 733 983 A2 | 3/1996 |
| EP | 0 749 081 A1 | 5/1996 |
| EP | 1 043 905 A2 | 10/2000 |
| WO | WO 99/33293 | 12/1998 |
| WO | WO 99/59283 | 5/1999 |
| WO | WO 00/77979 A2 | 12/2000 |

* cited by examiner

*Primary Examiner* — Tu X Nguyen

(57) ABSTRACT

The idle screen of a mobile telephone device is used to show updated information of a kind or from a source selected by a user (e.g. financial information, news, traffic etc.). Previously, the idle screen has been used to display the name of the network operator and alerting messages, such as '2 missed calls'. Placing information of interest to the user in the idle screen makes that information instantly accessible without the user having to navigate to the required function (e.g. a micro-browser) and select it.

16 Claims, 13 Drawing Sheets

Figure 11A
Overall flow: WAP/Web pull model
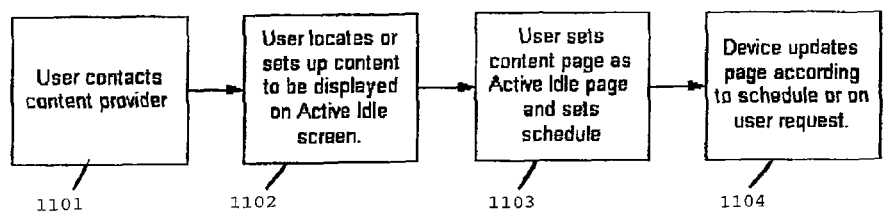
Mechanisms involved in updating process
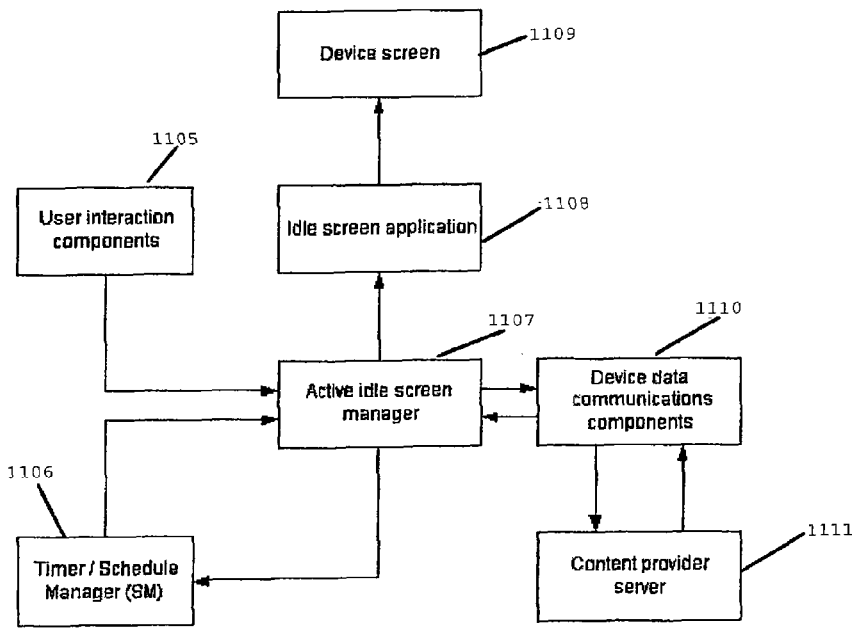
Figure 11B Figure 12A
Overall flow: WAP-push model
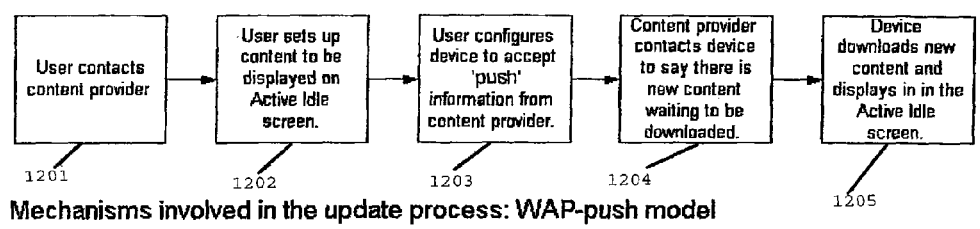
Mechanisms involved in the update process: WAP-push model
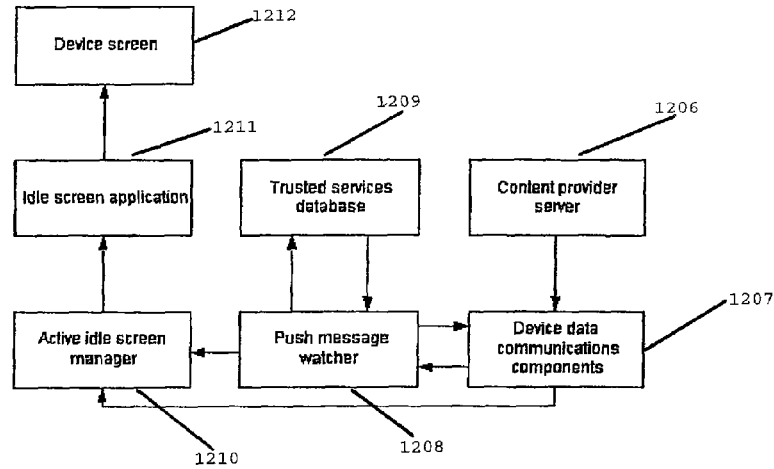
Figure 12B Figure 13A
Overall flow: message-based model
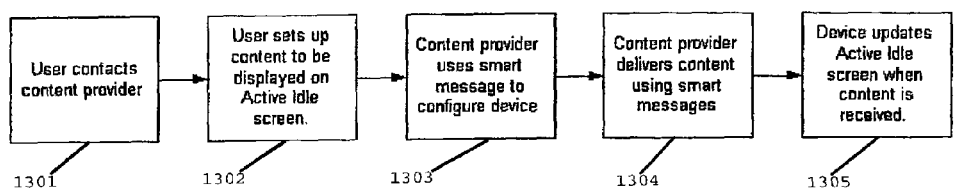
Mechanisms involved in the update process: message-based model
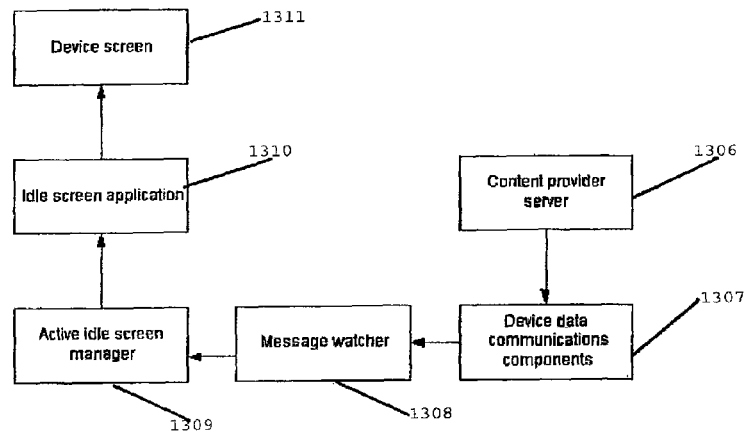
Figure 13B

MOBILE TELEPHONE DEVICE WITH USER-SELECTABLE CONTENT DISPLAYED AND UPDATED DURING IDLE TIME

CROSS REFERENCE TO RELATED APPLICATIONS

This application claims the priority of PCT Application No. PCT/GB01/05658 filed on Dec. 19, 2001 and British application GB 00301477.3 filed on Dec. 22, 2000, the contents of both of which are hereby incorporated by reference.

BACKGROUND TO THE INVENTION

Field of the Invention

This invention relates to the default screen displayed when portable electronic devices are not actively using a particular application and more particularly to a mobile telephone device with an idle screen.

DEFINITIONS

The term 'mobile telephone device' refers to any kind of small screen (e.g. A5 size or less) portable electronic device with voice communications capabilities, including radio telephones, smart phones, communicators and wireless information devices. The term 'idle screen' refers to the default screen displayed when the mobile telephone device is switched on and therefore capable of receiving a voice call. The idle screen is the screen which is displayed when the user is not navigating to a particular function, nor actively using a particular application, such as a contacts application, or a messaging application. Personal computers have no equivalent to an idle screen.

DESCRIPTION OF THE PRIOR ART

One of the problems facing the designers of mobile telephone devices is how to allow the user to access data and activate a desired function. Conventionally, the small display size (i.e. under A5 size) associated with a mobile telephone device has meant that functions need to be layered into multiple hierarchies: the interface can be thought of as having many layers, with the user having to first locate the correct top level function and then, within that function, progressively drill down (sometimes through 3 or more layers) to reach the target function. Finally, the user has to select an appropriate option to actually complete the required task. Navigating through multiple levels and performing numerous selections of various options can be both confusing and tedious for a user; often used functions can be rendered inconveniently inaccessible.

As an example, many mobile telephone devices now have internet WAP access to retrieve information from remote information sources; a WAP micro-browser currently typically enables simplified, text only WAP pages or 'cards' to be viewed. Reading WAP information on a mobile telephone device typically involves however the following multi-stage navigation process: (i) turn the client device on; (ii) view an idle screen; (iii) navigate from the idle screen to open the appropriate application (e.g. a micro-browser); (iv) select the required resource (e.g. open a particular WAP page); (v) enter a password and username; (vi) select the required information; (vii) wait for the download; and finally (viii) view the required information. This process is sufficiently slow and complicated to be unattractive to many users, especially the non-computer literate users to whom mobile telephone devices are particularly aimed.

Various attempts at improving menu accessibility by making more efficient use of the available screen 'real estate' have been proposed. For example, EP 891066 to Nokia Mobile Phones Ltd. teaches the approach of placing the most used functions in a mobile telephone into a particular menu list of the most commonly used functions. Hence, a user has to navigate first to the menu list of the most used functions, then select from within that list the required function. This saves the user having to navigate through potentially many more layers of the menu system to find and select the required function.

It will be appreciated that the field of Personal Computer ('PC') user interaction design is non-analogous to mobile telephone device user interaction design because a PC has a far larger screen size; hence, multiple application windows or their associated icons can be simultaneously displayed. Navigating between these windows/icons is generally a straightforward process of moving a mouse controlled cursor to the applicable window/icon. The user interaction designer working in the mobile telephone field however has a far more constraining environment to work within because of the very limited screen size. Another reason why mobile telephone device user interaction design is fundamentally different from that of PC user interaction design is that there is no equivalent to the idle screen in a PC.

Although the closest PC arts are non-analogous for the reasons given above, we note for completeness that in the PC domain, it is known to have a customisable web browser bar that a user can program to show information of interest to that user (e.g. a news ticker; a stock quote ticker etc.). But even here, a user still needs to (i) turn the client device on; (ii) view a start up screen; and (iii) progress from the start-up screen to open the browser application. If the browser has a permanent internet connection, a user may keep the browser application open, with the browser bar visible somewhere in the PC screen or readily selectable. But invariably the bulk of the screen will be occupied not with the small browser bar (with user selected information categories) but with one or more windows running applications (e.g. a word processing application etc.), exploiting the large screen size.

Reference may also be made to Phone.com EP 1043905, which shows using the idle screen of a mobile telephone to display advertisements and other information selected and sent by the network provider, but not information of a kind selected by the user. Geoworks WO 00/77979 shows using a mobile telephone to display advertisements, but not on an idle screen and not information of a kind selected by the user. Hence, this prior art fails to show the idea of using the idle screen to display updated (e.g. WAP pulled) information of a kind selected by the user.

On a more theoretical basis, an effective user interface enables the user to comprehend the changing internal status of the mobile telephone device as navigation proceeds. For example, to select or initiate a function (e.g. to open an address book function, enter a PIN security number or to alter the ring melody) a user has to understand (a) how to navigate to that function in order to select that function and (b) that the status of the telephone is such that the function can be selected or initiated. The technical problem of effectively enabling the internal state of the mobile telephone device to enable a user to view information from a remote resource without having to perform multiple navigation steps has to date been inadequately addressed.

SUMMARY OF THE PRESENT INVENTION

According to the invention, there is provided a mobile telephone device, the device being adapted to display, as part or all of an idle screen, updated information which is (a) defined by a user of the device to be of a kind which is of interest to him or her and is (b) supplied to the device from a remote information resource.

Hence, the fundamental insight of this invention is to use the idle screen of the mobile telephone device to show updated information obtained from a remote information source, in which the information is of a kind selected by the user (and not by an advertiser or network operator, as in the closest prior art). The information can be content such as financial information, news, traffic etc. Pushed from the network operator. The information may also be from a resource selected by a user (e.g. from a particular internet portal which the user selects; specific kinds of content from that portal will also usually also be selected). A 'remote information resource' contains information of interest to a potentially large number of users and is remotely accessible over a wireless connection. Web and WAP sites are examples of remote information resources.

Previously, the idle screen has primarily been used solely to display the name of the network operator and alerting messages, such as '2 missed calls', or other kinds of information selected, not by the user, but by an advertiser or network operator. Placing remotely sourced, updated information of interest to the user in the idle screen makes that information instantly accessible without the user having to navigate to the required application (e.g. a micro-browser), open that application (which may require a username and password) navigate to the required information and wait for it to download.

The value of the idle screen as a piece of screen 'real estate', immediately visible to a user, has not been capitalised on previously. By making the idle screen an intrinsically interesting and very frequently viewed screen, its value as a sponsorship and advertising platform is greatly enhanced. Hence, the sale of advertising and sponsor message occupancy on the idle screen is possible.

In one implementation, the remote information resource providing the content is an internet site, such as, but not limited to, a WAP site. Hyperlinks in the updated information shown in the idle screen can be navigated to. In addition to WAP content in WML format, content may also be provided by messages, including smart messages such as BioMessages™ from Symbian Limited of the United Kingdom.

The user may directly select the remote information resource by, for example, navigating to an internet site and defining elements of that site to appear in the idle screen. The user may also indirectly select the remote information resource by setting or agreeing to certain kinds of default profiles; for example, if a user selects a 'shopping' profile, then location specific information relating to nearby shops (e.g. special offers etc.) or links to nearby taxi firms or indeed nearby taxis could be pushed to the user's device to appear automatically in the idle screen of the user's mobile telephone device.

Preferably, alerting messages (e.g. "1 missed call") are displayed in addition to the updated information or alternating, possibly every few seconds, with that updated information.

Additional features may include the following:
The user being able to select the frequency or schedule of updated information; Updates can also be sent whenever a change to the content occurs. Having information pushed to the device in these ways means that the information shown on the idle screen is always reasonably up to date and the user does not need to wait for a download whenever he or she wishes to view reasonably current information.

Multiple information resources may be used with different priority settings; for example the idle screen may normally simply show information from a general news feed, but when a local traffic alert is issued, that can take priority over the general news information and be displayed in its place or together with the general news feed.

In another aspect of the invention, there is a method of supplying information for display on a mobile telephone device, comprising the step of sending from a remote information resource updated information defined by a user of the device to be of a kind which is of interest to him or her, in which the information is subsequently displayed on an idle screen of the device.

A further aspect of the invention is a remote information resource adapted to be suitable for supplying information as defined in the method of supplying information defined in the preceding paragraph.

Another aspect of the invention is computer software suitable for enabling a mobile telephone device to:
(i) retrieve or receive, from a remote information resource, information defined by a user of the device to be of a kind which is of interest to him or her;
(ii) display that information on an idle screen of the device.

BRIEF DESCRIPTION OF THE DRAWINGS

The invention will be described with reference to the accompanying drawings, in which:

FIGS. 11A and 11B are schematic flow charts of a WAP/Web pull implementation;

FIGS. 12A and 12B are schematic flow charts of a WAP push implementation;

FIGS. 13A and 13B are schematic flow charts of a message based implementation.

DETAILED DESCRIPTION

The present invention will be described with reference to an implementation called Active Idle™ from Symbian Limited of the United Kingdom; Active Idle allows a user to select WAP derived data to be pushed to his or her mobile telephone device and displayed as the idle screen, or as part of the idle screen. Active Idle can also be used not only for WAP but also 2.5G and 3G systems.

WAP is often sold on its ability to deliver a specific type of commodity: small chunks of frequently-changing information, such as sports scores, stock prices, flight status bulletins, cinema listings, news, weather forecasts, etc. As noted above, it is unfortunate therefore that getting at this information should conventionally require the user to delve through menus, open an application, enter a username and password and wait for a download.

With Active Idle, mobile telephone devices support embedding a scheduled-update WAP page, or content delivered via smart messages (such as Bio Messages), within the default or idle screen. Active Idle therefore provides user-selected key information at a glance, without requiring user actions, and without interrupting the user with alerts.

There are two main elements to setting up the idle screen in Active Idle:

Selecting the Information Itself.

While the user could select an existing WAP page as the idle screen, formatting problems, ad-junk, and the fact that the user might want information from disparate sources means that a customised page would typically be better. Portal companies like Yahoo!, AvantGo, mViva, MSN etc. may therefore allow tailoring of content to an appropriate format. Tailoring content would also involve setting the update schedules.

Setting the Page as the Idle Screen.

This could be done either by the user specifying a URL on the device, or via smart message setup.

The information delivery and display then practically runs itself, with only optional interventions from the user.

EXAMPLE

This example shows how the availability of an Active Idle screen might be exploited by Yahoo!™ over WAP: the service is called the Y! mobile Agent. The illustrated implementation is hypothetical only and should not be construed as implying that any such service is in fact available from or otherwise supported by Yahoo!.

Figure 1:
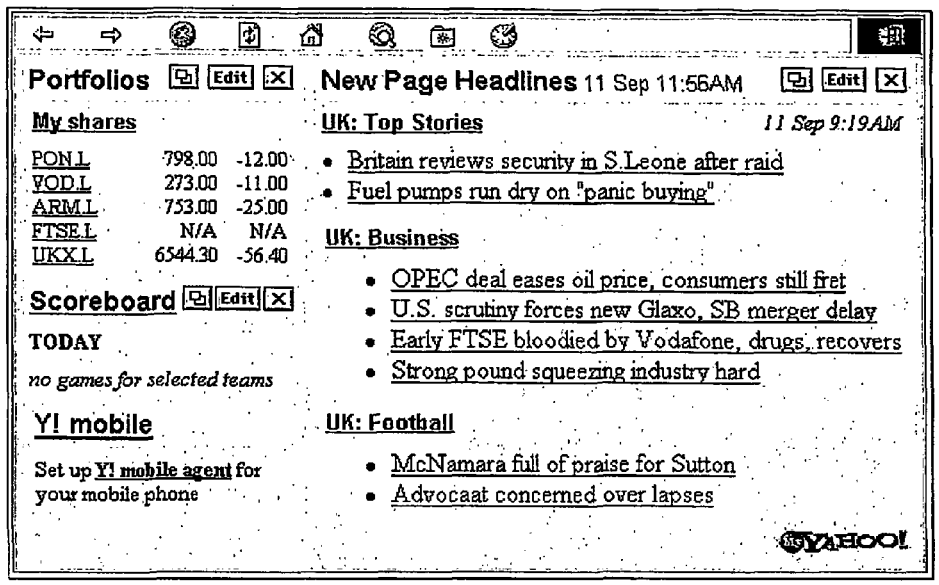
FIGS. 1-4 are screen shots showing how a web site can be accessed to set up automatic updating of information to a mobile telephone device as envisaged in the present invention.
Figure 2:
Figure 3:
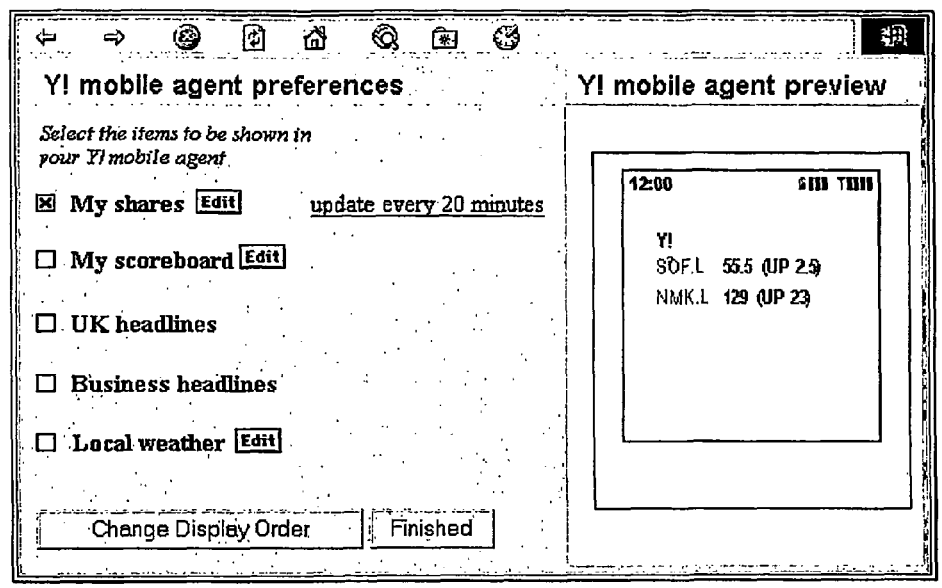
Figure 4:
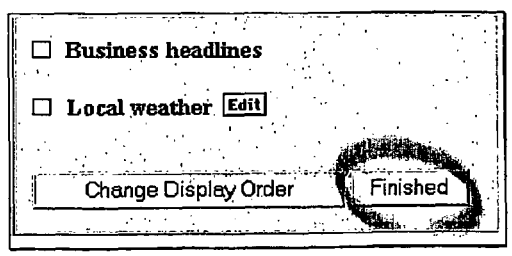

1. The user logs into My Yahoo! on his/her PC as shown in FIG. 1. Configuration could also be done via the mobile telephone device. For brevity, the term 'mobile telephone device' may be shortened to 'device' in this specification.
2. The user selects the option for setting up the Yahoo! mobile agent, as shown in FIG. 2
3. A setup screen informed by the user's existing My Yahoo! preferences allows the user to specify what is visible in the 'agent' or idle page, as shown in FIG. 3.
4. The user selects 'My shares' and 'My scoreboard', sets the update schedules and presses 'Finished' as shown in FIG. 4.

If the delivery mechanism is WAP, pressing 'Finished' sends a smart message to the user's mobile telephone device which will configure it to set the appropriate URL as the idle page.

If the delivery mechanism is smart messages, pressing 'Finished' simply initiates the first sending of data.

Figure 5:
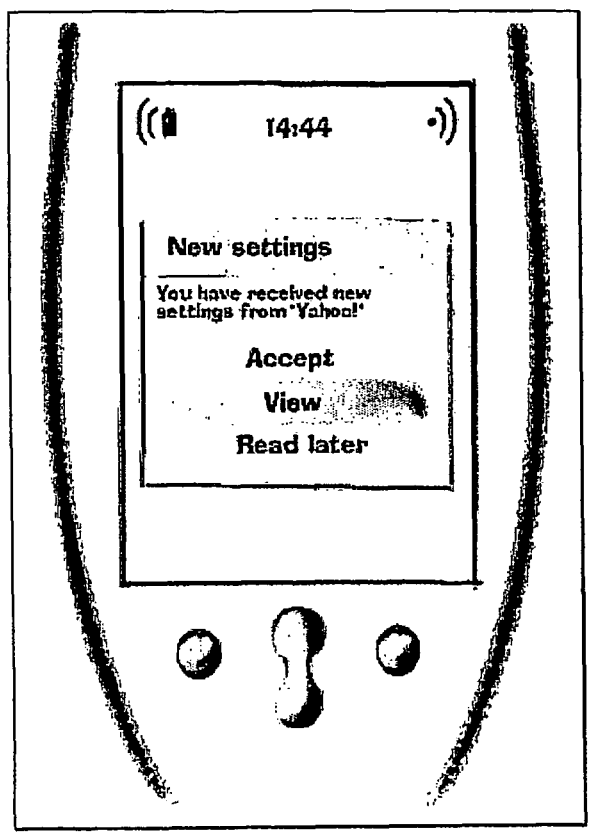
FIGS. 5-10B are schematic images showing a mobile telephone device with screen showing the various stages involved in using a system envisaged in the present invention.
Figure 6:
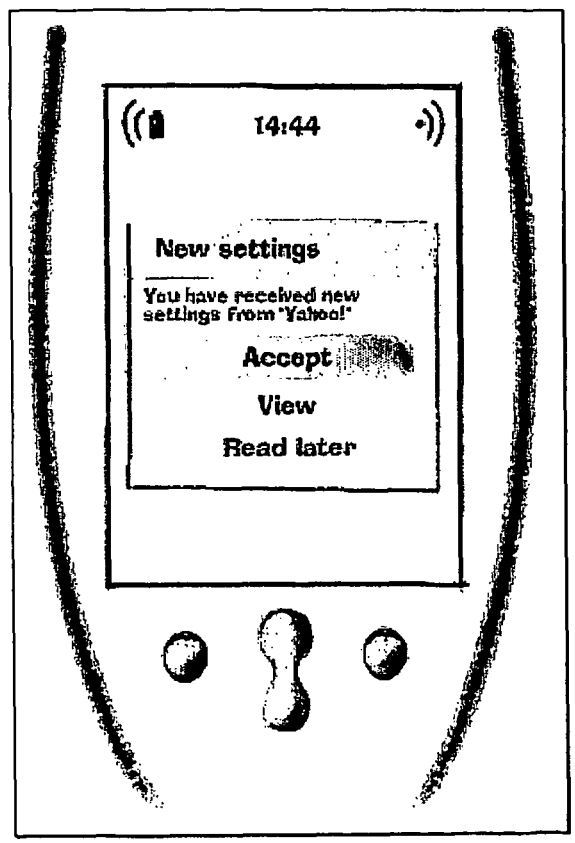
Figure 7:
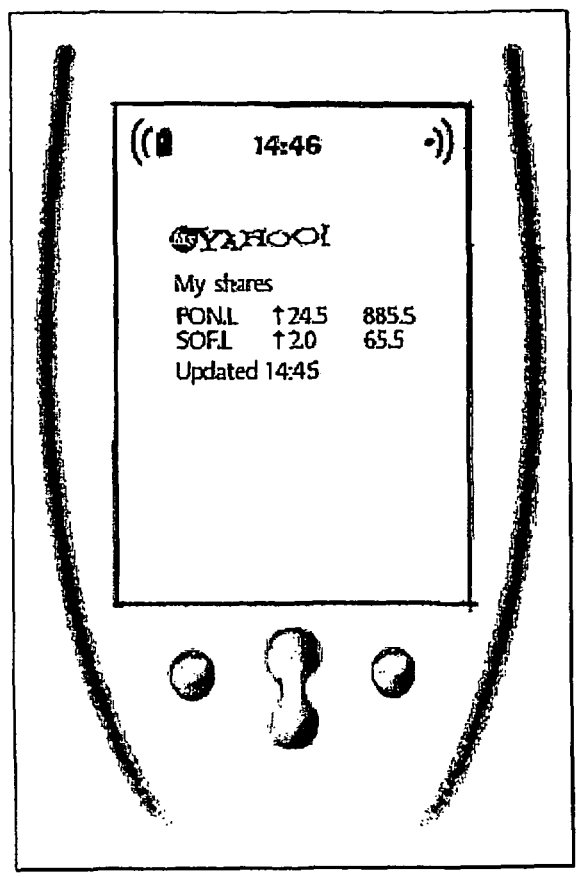

5. The user receives the message on his/her mobile telephone device(s) as shown in FIG. 5.
6. The user applies the settings as shown in FIG. 6.
7. Various processes are carried out and then the user gets the first delivery, as shown in FIG. 7.

The content includes branding elements. Apart from displaying the content, the device functions exactly as before.

Figure 8A:
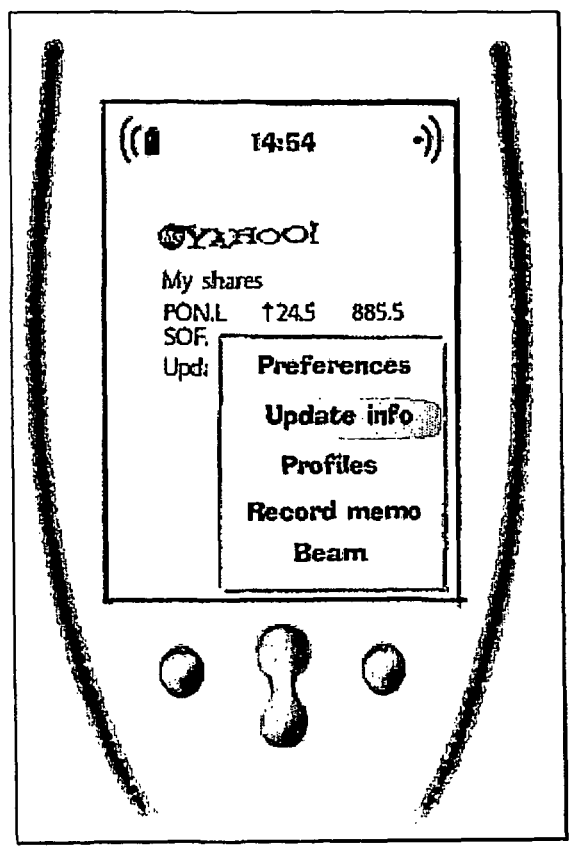
Figure 8B:
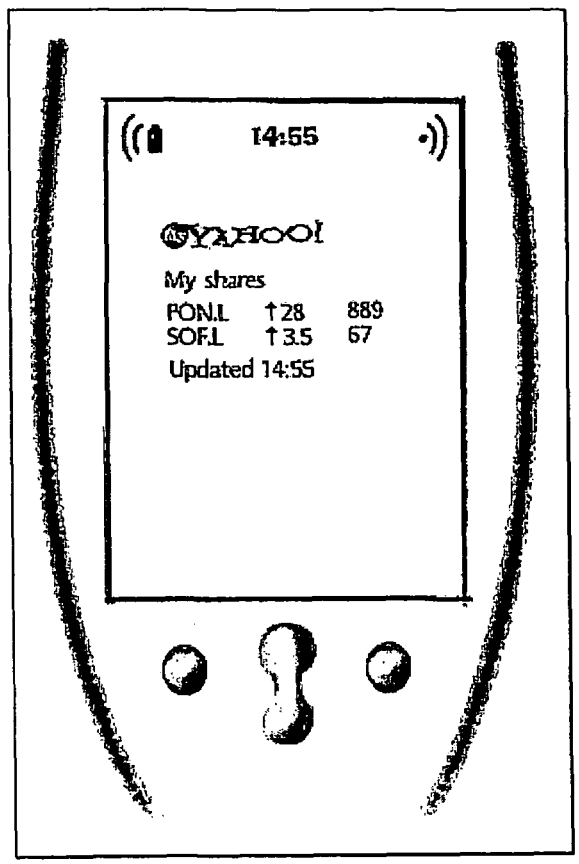
Figure 9:
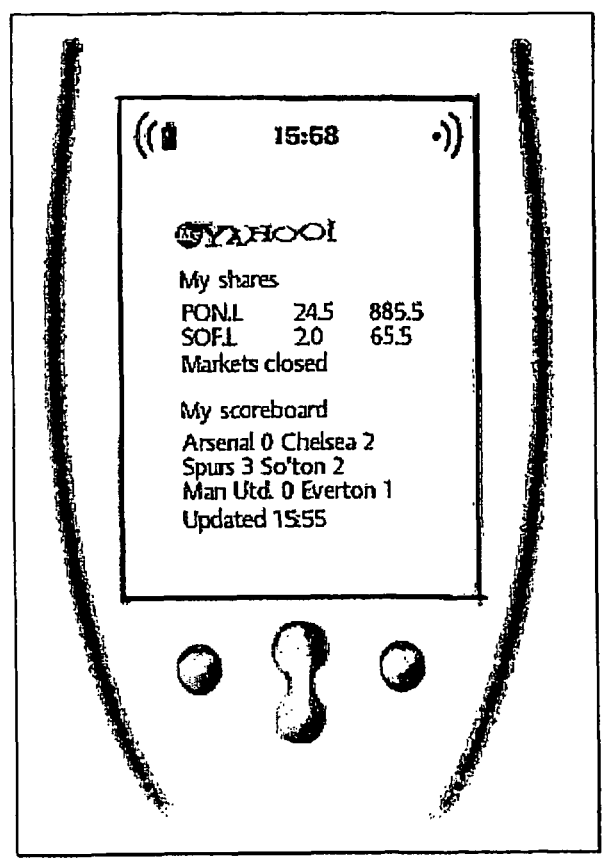
Figure 10A:
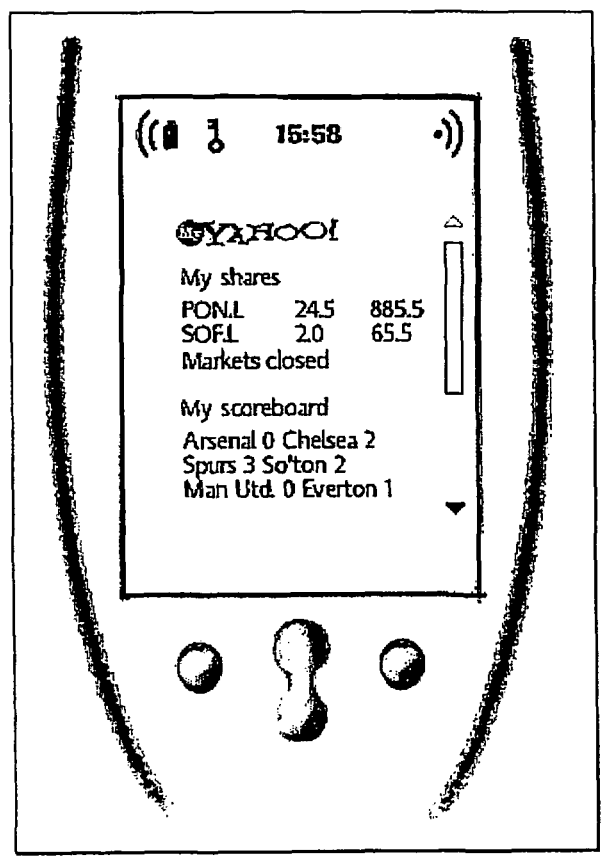
Figure 10B:
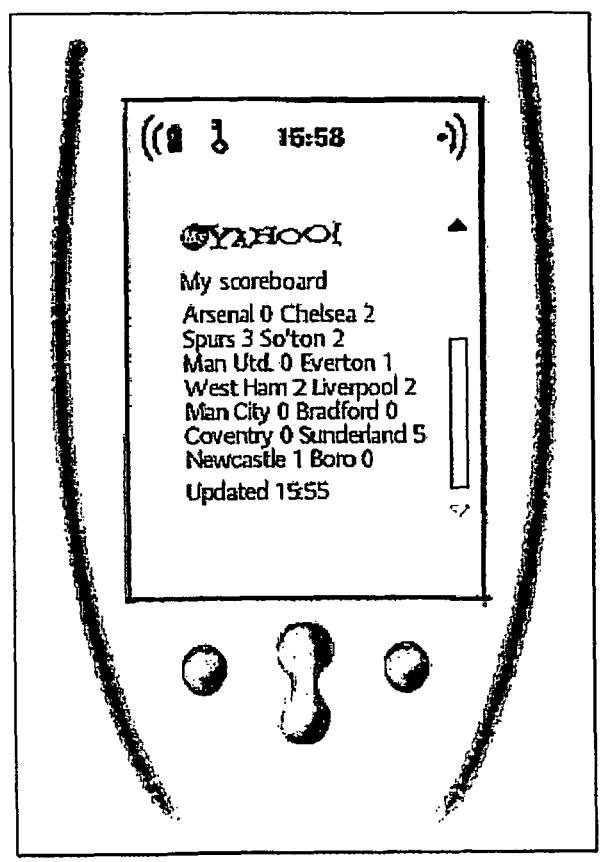

8. The update schedule is every 20 minutes, but the user can force an update at any time by using the device menu as shown in FIG. 8A, with an updated result being shown at FIG. 8B.
9. On match days, the soccer scoreboard component becomes active, as shown in FIG. 9. Updates could be pushed whenever there is a change.
10. If the content list is too long for the display area, the up and down arrow keys can be used even when the keypad lock is on as shown in FIG. 10A and FIG. 10B. This would require the device to ignore the keypress once an extremity of the list is reached, to prevent powerdrain if e.g. a key is pressed in a bag.

Many other mechanisms are possible; in the following sections, we describe implementations for:

WAP/Web pull

WAP Push

Other message-based system, such as BIOmessages.

These implementations are built using the Symbian OS™ platform from Symbian Limited of the United Kingdom. The Symbian OS platform is widely used for applications for mobile telephone devices. Software development kits and other development resources are readily available for the Symbian platform.

1. WAP/Web 'Pull' Model

This section describes the components, overall flow, and detailed flow of the updating process for the WAP/Web 'pull' model. This is where the content displayed as part of Active Idle is a normal Web or Wap page which is 'pulled' by the device at times dictated by an update schedule and then displayed in the idle screen.

Components:

User interaction components: those parts of the device software and hardware which allow user input and interaction (e.g. touchscreen controls, menus and buttons; hardware buttons; device keypads etc.).

Idle Screen Application (ISA): this is the application or collection of software components which controls the idle screen as a whole (including any other functionality beyond Active Idle and other information displayed etc.). The details of how this application component works are beyond the scope of this document.

Device screen: the device hardware apparatus for displaying information.

Timer & Schedule Manager (TSM): this component stores information about the update schedule set by the user, and operates a timer service based on this schedule information which counts down until the next update is due.

Active Idle Screen Manager (AISM): This component acts on input from the user and the TSM to initiate updates of the Active Idle screen content, commissions downloads of content from the DDCCs (see below), stores downloaded content, and passes downloaded content to the Idle Screen Application.

Device data communications components (DDCCs): software and hardware components in the device pertaining to establishing data calls and data connections with remote devices, maintaining those calls and connections, exchanging data with remote devices across those connections, and closing calls and connections. These components also store information about user identity and password(s) for dial-in services. The details of how these components work in themselves are beyond the scope of this document.

Content provider server: the content provider server storing the content.

Overall Flow (FIG. 11A):

1. The user contacts content provider using the device (typically through Web or WAP browser software) (step 1101) and determines content s/he desires to be shown in the idle screen (step 1102). This could be an existing web or, more appropriately on a small screen, WAP page. Or alternatively it could be a Web/WAP page generated according to the user's specified preferences for different sorts of information (e.g. sports results, cookery, news headlines). Services such as My Yahoo! Already offer this functionality for Web browsers.
2. The user instructs the device to set the current page as the Active Idle screen page, and sets the update schedule (e.g. 'Update every hour', or 'Update at 9 am') (step 1103).
3. The device displays the page content in the idle screen (step 1104).

Further updates of this content take place by the device automatically connecting to the server and retrieving the content according to the user's chosen schedule.

Mechanisms Involved in an Update (FIG. 11B):
1. An update can be initiated by either:
    a. the user instructing the device to update now, by using controls (e.g. a menu option) on the device (step 1105). (This kind of update could be called "Forced update".)
    b. the TSM instructing the AISM that it is time to update the content (step 1106).
2. Once an update is initiated, the AISM (step 1108) instructs the Device Data Communications Components to initiate a connection to the server and retrieve the content associated with the page address stored by the AISM (steps 1110 and 1111).
3. The DDCCs retrieve the appropriate content and return it to the AISM (steps 1110 and 1111).
4. The AISM stores the content and passes it to the Idle Screen Application specifying that the old content should be disregarded and the new content should be displayed in the Idle screen (step 1108).
5. The Idle Screen Application displays the content (step 1109).

The flow and mechanism are illustrated schematically in FIGS. 11A and 11B.

2. WAP-Push Model

This section describes the components, overall flow, and detailed flow of the updating process for an Active Idle screen based on a system using WAP 'push'.

Components:

Idle Screen Application (ISA): this is the application or collection of software components which controls the idle screen as a whole (including any other functionality beyond Active Idle and other information displayed such as battery strength etc.). The details of how this application component works are beyond the scope of this document.

Device screen: the device hardware apparatus for displaying information.

Active Idle Screen Manager (AISM): This component acts on input from the Message watcher, stores downloaded content, and passes downloaded content to the Idle Screen Application.

Push message watcher: a component which watches for push messages coming onto the device and processes them.

Device data communications components (DDCCs): software and hardware components in the device pertaining to establishing data calls and data connections with remote devices, maintaining those calls and connections, exchanging data with remote devices across those connections, and closing calls and connections. These components also store information about user identity and password(s) for dial-in services. The details of how these components work in themselves are beyond the scope of this document.

Trusted services database: a list of servers from whom 'push' content is accepted.

Content provider server: the content provider server sending the content.

Flow and Mechanism (FIGS. 12A and 12B):
1. User contacts content provider using the device (typically through a Wap browser software on the device) (step 1201), and determines content s/he desires to be shown in the idle screen (e.g. by 'subscribing' to a page, site or information service and specifying that this should be displayed in the device idle screen) (step 1202).
2. As part of the user's selection on the content provider's site, the user optionally sets the update schedule (e.g. 'Update every hour', or 'Update at 9 am' for news of prices of the user's share holdings). The user then configures the device to accept "push" information from the content provider (step 1203).
3. The server then sends messages to the device identified as a 'push notification' message type informing the device that there is new content waiting for download (steps 1204, 1206, 1207).
4. The Push message watcher (1208) checks that the message comes from a server the user has 'subscribed' to. If it does, it instructs the device communications components to initiate a connection and retrieve the new content from the content provider server (1209).
5. The content is then passed to the Active Idle screen manager, which then passes it to the Idle screen application for incorporation within the display (1205, 1210-1212).

The flow and mechanism are illustrated schematically in FIGS. 12A and 12B.

3. Message-Based Model

This section describes the components, overall flow, and detailed flow of the updating process for an Active Idle screen based on a system of messages being sent to the device.

Components:

Idle Screen Application (ISA): this is the application or collection of software components which controls the idle screen as a whole (including any other functionality beyond Active Idle and other information displayed etc.). The details of how this application component works are beyond the scope of this document.

Device screen: the device hardware apparatus for displaying information.

Active Idle Screen Manager (AISM): This component acts on input from the Message watcher, stores downloaded content, and passes downloaded content to the Idle Screen Application.

Message watcher: a component which identifies the 'type' of each message coming onto the device by standard message transports and processes it accordingly.

Device data communications components (DDCCs): software and hardware components in the device pertaining to establishing data calls and data connections with remote devices, maintaining those calls and connections, exchanging data with remote devices across those connections, and closing calls and connections. These components also store information about user identity and password(s) for dial-in services. The details of how these components work in themselves are beyond the scope of this document.

Content provider server: the content provider server sending the content.

Flow and Mechanism (FIGS. 13A and 13B):
1. User contacts content provider using the device (typically through Web or Wap browser software) or another means (e.g. through a browser on a desktop computer) (1301), and determines content s/he desires to be shown in the idle screen (1302). This could typically be by ticking boxes to indicate interests at a large content site. Many information service providers already provide services which deliver messages over SMS containing user-selected content (such as share price news) (1303, 1304).
2. As part of the user's configuration on the content provider's site, the user sets the update schedule (e.g. 'Update every hour', or 'Update at 9 am' for news prices of the user's share holdings).
3. The server then sends messages to the device identified as an 'Active Idle' message type, containing the content (1305, 1306-1307).

4. The Message watcher (1308) recognises the message as containing content for display in the idle screen and passes the message to the Active Idle Screen Manager (1309).
5. The content is then passed to the Idle screen application for incorporation within the display (1310-1311).

Note that this is not a secure model, since any message of the right type will be displayed in the device idle screen. A secure version could be implemented, where a key is given to the content provider to be used to identify itself as a trusted content provider. Messages without the key would be ignored, and the user could revoke the key at any time to remove the content provider from the group of trusted information services.

The flow and mechanism are illustrated schematically in FIGS. 13A and 13B.

Extensions of Concept

The following are extensions to the Active Idle implementation:

- Links could be incorporated in the page. They would be opened by, for example, selecting (via scroll control) and using a menu command or pressing 'the device's Send' key.
- A large amount of content could be delivered and displayed via a 'self-scrolling loop', like a vertically scrolling ticker on the page.
- Services could provide information based on the user's locale. This could mean, for example, that the user always had a link for a local taxi firm available on the device idle screen.
- Implementing this using a message-based system would allow companies currently supplying information via SMS to do so in a way that was less intrusive to the users.
- If the user is playing a multi-player game on the mobile telephone device, then game status and move information could be included in the idle screen;
- If the mobile telephone device is also a music download platform (e.g. downloads from mp3 music sites or is a digital radio receiver), then information in the idle screen can relate to the currently played music track (e.g. artist information, track information, concert dates, links to e-commerce functionality such as buying CDs).
- The information in the idle screen can also be location specific information, where the device is displaying information available about, or even (say, via radio communication such as Bluetooth) available in, the user's local environment. Examples include the following:
  - Timetable information at train stations or airports
  - Information on historic monuments or museum exhibits the user is standing near
  - Where nearby devices (such as security doors, printers etc.) display password screens on the user's device to allow access
  - Where the device is a multimedia terminal and the area of the idle screen is used to display listings of available 'channels' which can be opened up.

The invention claimed is:

1. A mobile communication device capable of supplying information to an end-user, the mobile communication device being adapted to receive and display the information from a remote information resource;
   wherein the mobile communication device is adapted to enable the end-user to select the remote information resource prior to the mobile communication device entering an idle screen state, enable the end-user to customize the idle screen to display the information according to the end-user's specified preferences, the information is for display on an idle screen of the mobile communication device, and the information is updated while the mobile communication device is in the idle screen state.

2. The mobile communication device of claim 1 in which the information is from a source selected by the user.

3. The mobile communication device of claim 1 in which advertising and/or sponsor messages are also displayed on the idle screen.

4. The mobile communication device of claim 1 in which the remote information resource providing the content is an internet site.

5. The mobile communication device of claim 4 in which there are hyperlinks in the updated information shown in the idle screen which are capable of being navigated to and selected by the user.

6. The mobile communication device of claim 1 in which the remote information resource provides the information of interest via smart messages.

7. The mobile communication device of claim 1 in which alerting messages are displayed in addition to the updated information or alternating with that updated information.

8. The mobile communication device of claim 1 in which the user is able to select the frequency or schedule of updated information.

9. The mobile communication device of claim 1 in which multiple information resources are used with different priority settings.

10. The mobile communication device of claim 1 in which the updated information relates to one or more of the following:
    (a) financial information;
    (b) sports information;
    (c) news information;
    (d) traffic information;
    (e) weather information.

11. The mobile communication device of claim 1 wherein the mobile communication device is adapted to enable the end-user to select, from the remote information resource, information to be displayed to the end-user such that updated versions of that information are sent automatically to the mobile communication device for display on said idle screen of the mobile communication device.

12. A method of displaying information on a mobile communication device, comprising:
    (a) enabling an end-user to select a remote information resource prior to the mobile communication device entering an idle screen state, wherein information content retrieved from the remote information resource is customized according to the end-user's specified preferences and displayed on an idle screen of the mobile communication device during the idle screen state; and
    (b) retrieving updated information content from the remote information resource during the idle screen state.

13. A computer-readable medium encoded with a computer program instructing a mobile communication device to:
    (a) retrieve or receive, from a remote information resource, updated information during an idle screen state; and
    (b) display that updated information on the mobile communication device;
    wherein (i) the mobile communication device determines, prior to the mobile communication device entering the idle screen state, the kind of updated information which is to be retrieved or received based on a user selection, and (ii) the updated information is displayed as part or all of an idle screen on the mobile communication device according to an end-user's specified preferences.

14. A computer program product for displaying information on a mobile communication device, comprising a computer-readable storage medium having computer-readable program code embodied in the medium, the computer-readable program code comprising:
   (a) computer-readable program code for enabling an end-user to select a remote information resource prior to the mobile communication device entering an idle screen state, wherein information content retrieved from the remote information resource is customized according to the end-user's specified preferences and displayed on an idle screen of the mobile communication device during the idle screen state; and
   (b) computer-readable program code for retrieving updated information content from the remote information resource during the idle screen state.

15. A mobile device configured to:
   (a) retrieve or receive, from a remote information resource, updated information during an idle screen state; and
   (b) display that updated information on the mobile device during the idle screen state;
   wherein (i) the kind of updated information which is to be retrieved or received is determined prior to the mobile device entering the idle screen state based on a user input, and (ii) the updated information is displayed as part or all of an idle screen on the mobile device according to an end-user's specified preferences.

16. A method of displaying information on a mobile device, comprising:
   (a) retrieving or receiving, by the mobile device, updated information from a remote information resource during an idle screen state; and
   (b) displaying that updated information on the mobile device during the idle screen state;
   wherein (i) the kind of updated information which is to be retrieved or received is determined prior to the mobile device entering the idle screen state based on a user input, and (ii) the updated information is displayed as part or all of an idle screen on the mobile device according to an end-user's specified preferences.

* * * * *